United States Patent
Kim

(10) Patent No.: US 10,522,795 B2
(45) Date of Patent: Dec. 31, 2019

(54) POUCH TYPE SECONDARY BATTERY AND MANUFACTURING METHOD THEREOF

(71) Applicant: LG Chem, Ltd., Seoul (KR)

(72) Inventor: Ji Hyun Kim, Daejeon (KR)

(73) Assignee: LG Chem, Ltd. (KR)

( * ) Notice: Subject to any disclaimer, the term of this patent is extended or adjusted under 35 U.S.C. 154(b) by 171 days.

(21) Appl. No.: 15/102,984

(22) PCT Filed: Sep. 24, 2015

(86) PCT No.: PCT/KR2015/010069
§ 371 (c)(1),
(2) Date: Jun. 9, 2016

(87) PCT Pub. No.: WO2016/064099
PCT Pub. Date: Apr. 28, 2016

(65) Prior Publication Data
US 2016/0315294 A1    Oct. 27, 2016

(30) Foreign Application Priority Data
Oct. 20, 2014   (KR) .................. 10-2014-0141739

(51) Int. Cl.
*H01M 2/02*   (2006.01)
*H01M 10/04*  (2006.01)
(Continued)

(52) U.S. Cl.
CPC ......... *H01M 2/0202* (2013.01); *H01M 2/021* (2013.01); *H01M 2/0212* (2013.01);
(Continued)

(58) Field of Classification Search
CPC ...... H01M 2/0202; H01M 2/263; H01M 2/08; H01M 2/0212; H01M 2/021;
(Continued)

(56) References Cited

U.S. PATENT DOCUMENTS

| 2010/0055558 A1 | 3/2010 | Choi et al. |
| 2010/0255368 A1 | 10/2010 | Park et al. |

(Continued)

FOREIGN PATENT DOCUMENTS

| CN | 101454925 A | 6/2009 |
| CN | 101904029 A | 12/2010 |

(Continued)

OTHER PUBLICATIONS

International Search Report for Application No. PCT/KR2015/010069 dated Dec. 17, 2015.

(Continued)

*Primary Examiner* — Ula C Ruddock
*Assistant Examiner* — Matthew W Van Oudenaren
(74) *Attorney, Agent, or Firm* — Lerner, David, Littenberg, Krumholz & Mentlik, LLP

(57) ABSTRACT

Disclosed is a pouch type secondary cell. The pouch type secondary cell includes an electrode assembly including a cell and an electrode, a pouch having a receiving space configured to receive the electrode assembly therein, the pouch including upper and lower sheets configured to surround upper and lower plate surfaces of the electrode assembly respectively, and a terrace sealing formed by compressing the upper and lower sheets, which surround a terrace, in a thickness direction thereof so that the upper and lower sheets come into contact with each other, the terrace being an empty space in the receiving space excluding a space occupied by the electrode assembly.

10 Claims, 7 Drawing Sheets

(51) Int. Cl.
*H01M 2/08* (2006.01)
*H01M 2/26* (2006.01)

(52) U.S. Cl.
CPC ............ *H01M 2/08* (2013.01); *H01M 2/263* (2013.01); *H01M 10/0481* (2013.01); *H01M 2/0217* (2013.01); *H01M 2/0287* (2013.01); *H01M 2002/0205* (2013.01); *H01M 2220/30* (2013.01)

(58) Field of Classification Search
CPC ............ H01M 2/0287; H01M 2/0217; H01M 10/0481; H01M 10/52; H01M 10/445; H01M 10/448; H01M 2220/30; H01M 2002/0205
See application file for complete search history.

(56) References Cited

U.S. PATENT DOCUMENTS

| | | | |
|---|---|---|---|
| 2012/0189909 A1* | 7/2012 | Hohenthanner | H01M 2/0212 429/186 |
| 2013/0244093 A1* | 9/2013 | Min | H01M 2/0287 429/185 |
| 2015/0044536 A1* | 2/2015 | Kwon | H01M 2/0207 429/94 |

FOREIGN PATENT DOCUMENTS

| | | | |
|---|---|---|---|
| CN | 102549799 | A | 7/2012 |
| JP | 2004103360 | A | 4/2004 |
| JP | 2005038613 | A | 2/2005 |
| JP | 2008052932 | A | 3/2008 |
| JP | 2009532843 | A | 9/2009 |
| JP | 2011507208 | A | 3/2011 |
| JP | 2012533858 | A | 12/2012 |
| KR | 20030059930 | A | 7/2003 |
| KR | 100884945 | B1 | 2/2009 |
| KR | 1020110109824 | A | 10/2011 |
| KR | 1020130044705 | A | 5/2013 |
| KR | 1020140041057 | A | 4/2014 |
| KR | 1020140103402 | A | 8/2014 |
| WO | WO2013074212 | * | 6/2012 |
| WO | 2013137611 | A1 | 9/2013 |
| WO | WO2013137611 | * | 9/2013 |

OTHER PUBLICATIONS

Extended Search Report from European Application No. 15852017.1, dated Sep. 14, 2016.
Search Report for Chinese Application No. 201580003954.0 dated Jan. 2, 2018.

* cited by examiner

[Fig. 1]
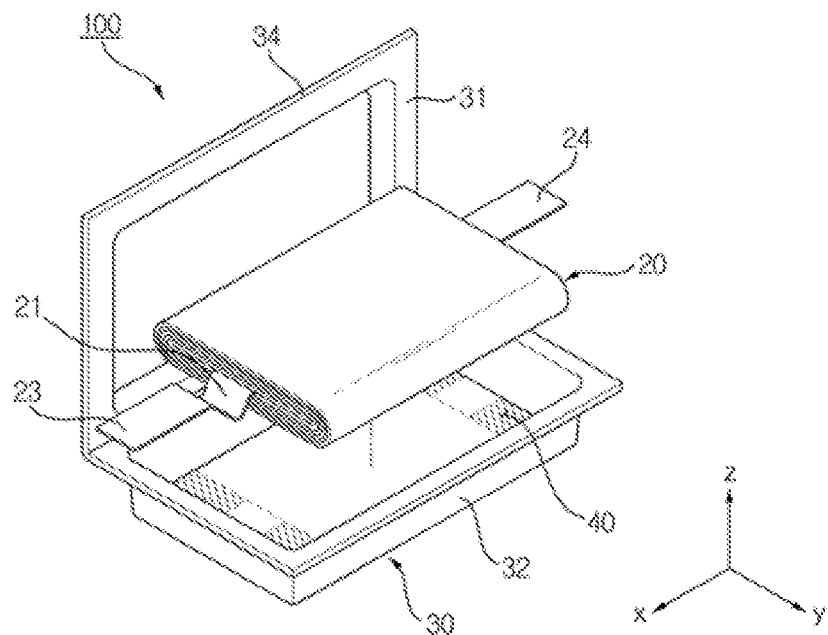
[Fig. 2]
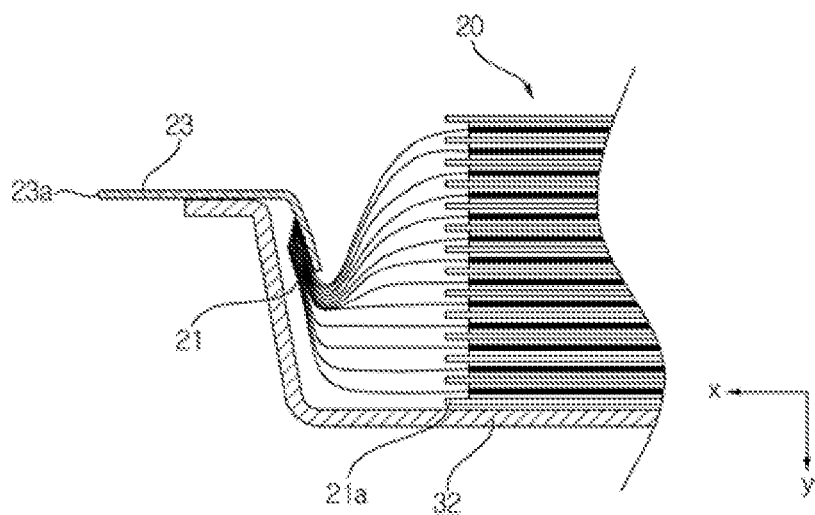

[Fig. 3]
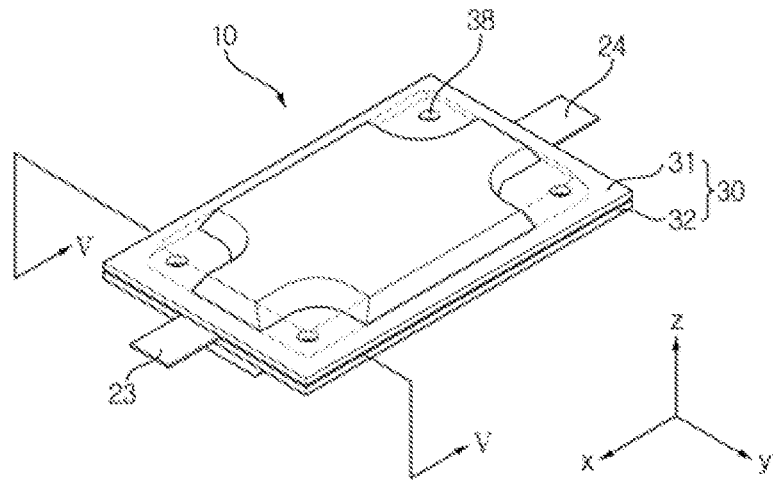
[Fig. 4]
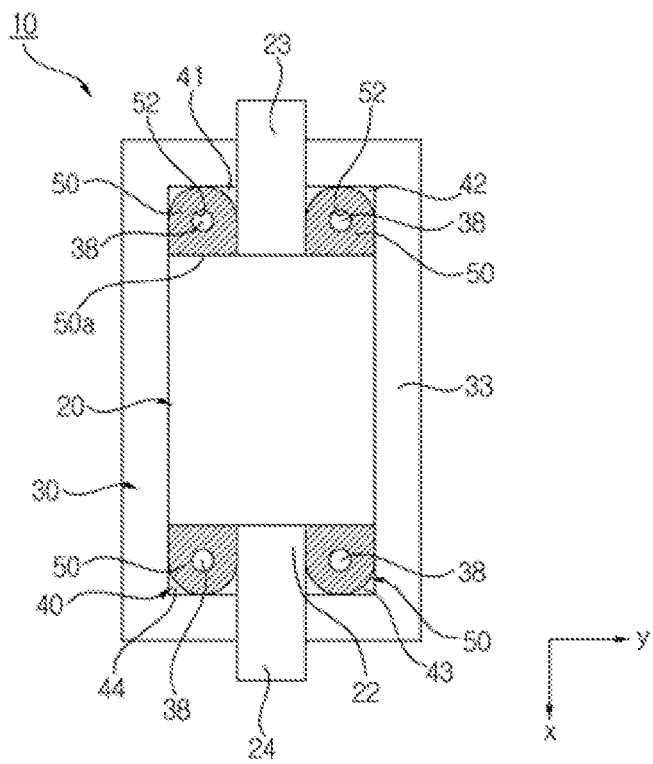
40:41,42,43,44

[Fig. 5]
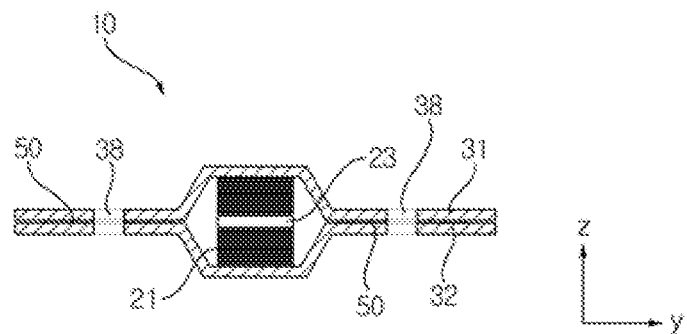
[Fig. 6a]
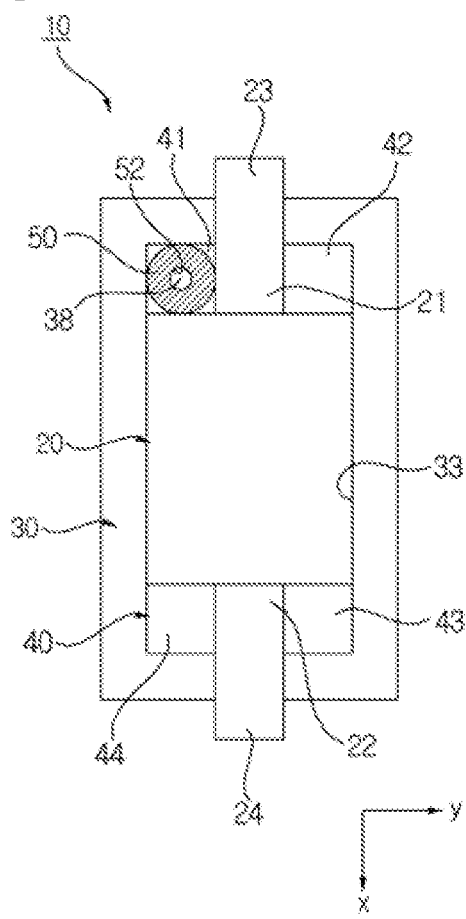

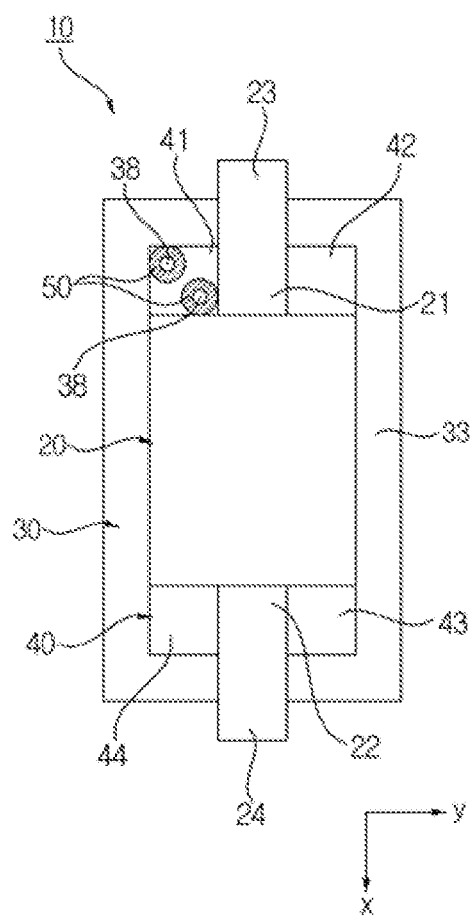
【Fig. 6b】

[Fig. 6c]
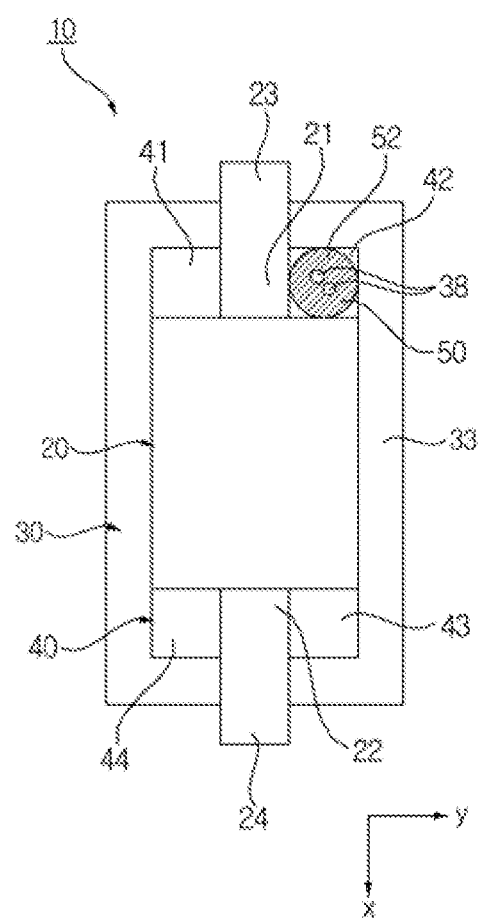

[Fig. 6d]
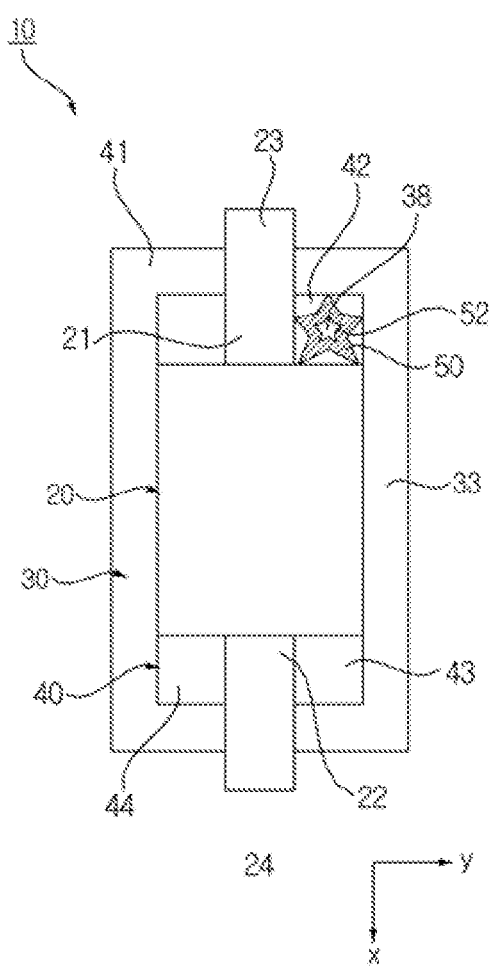

[Fig. 7]
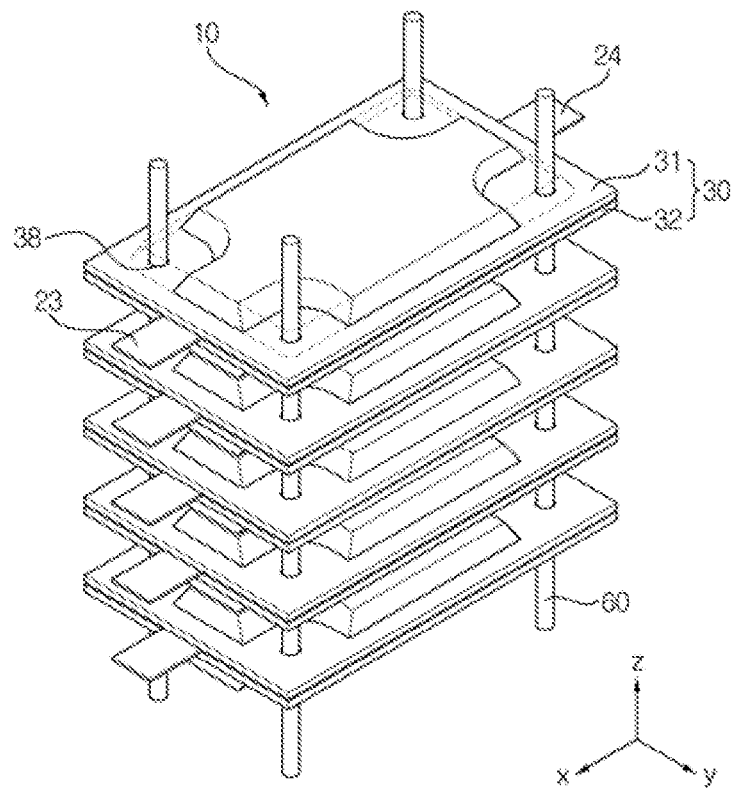
[Fig. 8]
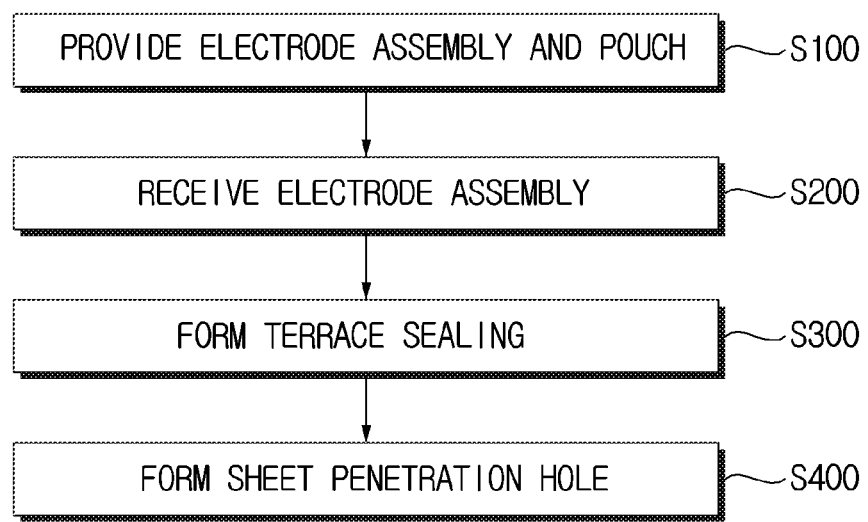

POUCH TYPE SECONDARY BATTERY AND MANUFACTURING METHOD THEREOF

TECHNICAL FIELD

The present invention relates to a pouch type secondary battery and a manufacturing method thereof, and more particularly to a pouch type secondary battery, which is capable of stably fixing an electrode assembly and preventing internal short circuits, and a manufacturing method thereof.

BACKGROUND

Advances in technical development and increased demand for mobile appliances have caused a rapid increase in the demand for batteries serving as an energy source, and accordingly, many studies have been conducted on batteries capable of meeting the demand.

Representatively, with regard to the shape of batteries, there is a high demand for angled secondary batteries and pouch type secondary batteries, which are thin and thus may be applied to products such as, for example, portable phones. In addition, from the aspect of materials, there is a high demand for lithium secondary batteries such as, for example, lithium ion batteries and lithium ion polymer batteries, which have a high energy density, discharge voltage, and output stability.

FIG. 1 is an exploded perspective view illustrating a general pouch type secondary battery. The pouch type secondary battery 100 includes an electrode assembly 20, electrode tabs 21 extending from the electrode assembly 20, electrode leads 23 and 24 welded to the electrode tabs 21, and a pouch 30 configured to receive the electrode assembly 20 therein.

Here, the electrode assembly 20 is an electric power generation element in which a positive electrode and a negative electrode are stacked one above another in sequence with a separator interposed therebetween, and has a stack type or stack/folding type configuration. The electrode tabs 21 extend from respective electrode plates of the electrode assembly 20.

In addition, the electrode leads 23 and 24 are electrically connected to the respective electrode tabs 21, which extend from the respective electrode plates, via welding, and portions of the respective electrode leads are exposed outside of the pouch 30. At this time, an insulation film (not illustrated) is attached to portions of the upper and lower surfaces of the electrode leads 23 and 24 in order to increase the efficiency with which the electrode leads are sealed by the pouch 30 and to ensure the electrical insulation thereof.

In addition, the pouch 30 is formed of an aluminum laminate sheet and provides a space in which the electrode assembly 20 may be received.

The pouch type secondary battery has low fixing force because the electrode assembly 20 and the electrode leads 23 and 24 are fixed to a sealing region of the pouch 30, and the electrode assembly 20 may unintentionally move within the pouch 30.

Meanwhile, FIG. 2 is a conceptual view illustrating the arrangement of the electrode tabs and electrode leads when the electrode assembly is seated in the pouch. The positive electrode taps 21 protrude from a positive electrode collector 21a of the electrode assembly 20 and are integrally connected to the positive electrode lead 23 via welding.

The positive electrode lead 23 is sealed by the pouch 30 such that opposite ends 23a thereof connected to positive electrode tap bonds are exposed, and the positive electrode taps 21 are integrally coupled to one another so as to form the bonds. As such, the inner upper end of the pouch 30 is spaced apart from the surface of the upper end of the electrode assembly 20 by a given distance, and the positive electrode taps 21 of the bonds are bent in the direction crossing the extending direction thereof. As illustrated in FIG. 2, the region where the electrode tabs and the electrode lead are coupled has a shape similar to the alphabet letter "V", and thus is referred to as a V-forming region. With the coupling region of the electrode tabs and the electrode lead, as illustrated in FIG. 1, the inner space of the pouch 30 includes a so-called terrace 40, which is an empty space not occupied by the electrode assembly 20 and the electrode leads 23 and 24.

In a conventional pouch type secondary battery, the electrode assembly 20 easily moves along the interface with a battery case due to the terrace 40, which is an empty space, when the battery falls or receives vibration shocks.

In particular, an electrolyte containing lithium salt, which is injected into the pouch 30, serves as a lubricant at the interface between the electrode assembly 20 and the pouch 30, thereby facilitating movement of the electrode assembly 20. The movement of the electrode assembly 20 causes internal short circuits, attributable to the contact of different electrodes at the V-forming region, ultimately, deteriorating the safety of the battery. Therefore, the manufacture of the pouch type battery requires a solution in order to secure the safety thereof.

PRIOR ART DOCUMENT (Patent Document 1) Korean Patent Registration Publication No. 10-0884945

(Patent Document 2) Japanese Patent Laid-Open Publication No. 2005-038613

DISCLOSURE

Technical Problem

Therefore, the present invention has been made in view of the above problems, and it is an object of the present invention to provide a pouch type secondary battery having a terrace sealing, which seals a terrace formed in a pouch in which an electrode assembly is received.

In addition, it is another object of the present invention to provide a pouch type secondary battery in which a through-hole is provided at a terrace sealing so as to enable the discharge of gas generated during the manufacture of the battery while allowing the through-hole to be sealed by the terrace sealing.

Technical Solution

In accordance with an aspect of the present invention, the above and other objects can be accomplished by the provision of a pouch type secondary battery including an electrode assembly including a cell and an electrode, a pouch having a receiving space configured to receive the electrode assembly therein, the pouch including upper and lower sheets configured to surround upper and lower plate surfaces of the electrode assembly respectively, and a terrace sealing formed by compressing the upper and lower sheets, which surround a terrace, in a thickness direction thereof so that the upper and lower sheets come into contact with each other, the terrace being an empty space in the receiving space excluding a space occupied by the electrode assembly.

In the pouch type secondary battery according to the present invention, the terrace sealing may be formed such that a cross section thereof in a plane crossing the thickness direction of the sheets has any one of circular, polygonal, and amorphous shapes.

In the pouch type secondary battery according to the present invention, the cross section of the terrace sealing may have a line formed along the electrode assembly so as to prevent an empty space from being defined in a region where the terrace sealing comes into contact with the electrode assembly.

In the pouch type secondary battery according to the present invention, when the plate surface of the electrode assembly has a polygonal shape, the terrace sealing may be formed in at least one of respective corners of the electrode assembly having a polygonal shape.

In the pouch type secondary battery according to the present invention, the battery may further include an electrode lead electrically connected to the electrode of the electrode assembly, one end of the electrode lead being exposed outside the pouch. In addition, the pouch may include an outer peripheral sealing region formed to seal the electrode assembly by bonding outer peripheral regions of the upper and lower sheets to each other. In addition, the terrace sealing may be surrounded by the outer peripheral sealing region, the electrode assembly, and the electrode lead.

In the pouch type secondary battery according to the present invention, the terrace sealing may be shaped such that a cross section thereof in a direction crossing the thickness direction of the sheets comes into contact with all of the outer peripheral sealing region, the electrode assembly, and the electrode lead.

In the pouch type secondary battery according to the present invention, the battery may further include at least one sheet penetration hole formed in at least one of the upper and lower sheets so as to penetrate the at least one sheet in the thickness direction, and the sheet penetration hole may be formed at a position overlapping the terrace sealing.

In accordance with another aspect of the present invention, there is provided a method of manufacturing a pouch type secondary battery including providing an electrode assembly including a cell and an electrode and a pouch having a receiving space configured to receive the electrode assembly therein, the pouch including upper and lower sheets configured to surround upper and lower plate surfaces of the electrode assembly respectively, receiving the electrode assembly in the receiving space in the pouch, and forming a terrace sealing by compressing the upper and lower sheets, which surround a terrace, in a thickness direction so as to bond the upper and lower sheets to each other, the terrace being an empty space in the receiving space excluding a space occupied by the electrode assembly.

In the method of manufacturing the pouch type secondary battery according to the present invention, the forming may include forming the terrace sealing such that a cross section thereof in a plane crossing the thickness direction of the sheets has any one of circular, polygonal, and amorphous shapes.

In the method of manufacturing the pouch type secondary battery according to the present invention, the cross section of the terrace sealing may have a line formed along the electrode assembly so as to prevent an empty space from being defined in a region where the terrace sealing comes into contact with the electrode assembly.

In the method of manufacturing the pouch type secondary battery according to the present invention, when the plate surface of the electrode assembly has a rectangular shape, the forming may include forming the terrace sealing in at least one of respective corners of the electrode assembly having a rectangular shape.

In the method of manufacturing the pouch type secondary battery according to the present invention, the method may further include forming a sheet penetration hole in the upper and lower sheets so as to penetrate the upper and lower sheets in the thickness direction, before or after the forming the terrace sealing, and the sheet penetration hole may be formed at a position overlapping the terrace sealing.

Advantageous Effects

According to the embodiments of the present invention, as a result of selectively forming a sheet penetration hole in upper and lower sheets, which close a terrace in a pouch in which an electrode assembly is received, it is possible to discharge gas generated during manufacture and to allow the sheet penetration hole to be sealed by a terrace sealing, which may provide a secondary battery capable of stably fixing the electrode assembly and preventing internal short circuits, thereby ultimately achieving excellent safety. In addition, it is possible to discharge gas inside a pouch through the penetration hole during manufacture.

DESCRIPTION OF DRAWINGS

FIG. 1 is an exploded perspective view illustrating a general pouch type secondary battery.

FIG. 2 is a conceptual view illustrating the arrangement of electrode tabs and an electrode lead when an electrode assembly is seated in a pouch.

FIG. 3 is a perspective view illustrating a pouch type secondary battery in accordance with one embodiment of the present invention.

FIG. 4 is a plan view schematically illustrating the pouch type secondary battery in accordance with one embodiment of the present invention.

FIG. 5 is a sectional view taken along line V-V of FIG. 3.

FIGS. 6A to 6D are plan views illustrating alternative embodiments of a terrace sealing in the pouch type secondary battery in accordance with one embodiment of the present invention.

FIG. 7 is a conceptual view illustrating a plurality of pouch type secondary batteries, which is successively aligned, in accordance with one embodiment of the present invention.

FIG. 8 is a flowchart illustrating a method of manufacturing a pouch type secondary battery in accordance with one embodiment of the present invention.

MODE FOR INVENTION

Hereinafter, to allow those skilled in the art to easily implement the present invention, the embodiments of the present invention will be described in detail with reference to the accompanying drawings. However, the present invention may be embodied in various different forms, and is not limited to the embodiments described herein. The same or similar elements are denoted by the same reference numerals throughout the specification.

In addition, in the entire specification, when an element is referred to as "including" another element, the element should not be understood as excluding other elements so long as there is no special conflicting description, and the element may include at least one other element. In addition, it will be understood that, when an element is referred to as being "on" another element, this means that the element is located above or below the other element and does not mean that the element is necessarily located above the other element in the direction of gravity.

FIG. 3 is a perspective view illustrating a pouch type secondary battery in accordance with one embodiment of the present invention, FIG. 4 is a plan view schematically illustrating the pouch type secondary battery in accordance with one embodiment of the present invention, and FIG. 5 is a sectional view taken along line V-V of FIG. 3.

Referring to FIGS. 3 and 4, the pouch type secondary battery 10 in accordance with one embodiment of the present invention includes an electrode assembly 20, a pouch 30, and a terrace sealing 50.

The electrode assembly 20 is an assembly of unit cells. Each unit cell includes a positive electrode having a positive electrode plate coated with a positive electrode active material, a negative electrode having a negative electrode plate coated with a negative electrode active material, and a separator, which electrically separates the positive electrode and the negative electrode from each other.

The positive electrode is manufactured by applying a mixture of the positive electrode active material, a conductor, and a binder on the positive electrode plate, and drying the same. As needed, a filler may be added to the mixture.

The positive electrode plate is mainly formed of aluminum (Al). The positive electrode plate may be formed of stainless steel, nickel (Ni), titanium (Ti), or baked carbon (C), or may be formed by treating the surface of aluminum (Al) or stainless steel with, for example, carbon, nickel, titanium, or silver (Ag). Any other materials may be used without limitation so long as they are highly conductive and do not cause chemical variation in the secondary battery.

The negative electrode may be manufactured by applying the negative electrode active material on the negative electrode plate, and drying the same, and as needed, may further include the components described above.

The negative electrode plate is mainly formed of copper (Cu). The negative electrode plate may be formed of stainless steel, aluminum (Al), nickel (Ni), titanium (Ti), or baked carbon (C), or may be formed by treating the surface of copper or stainless steel with, for example, carbon, nickel, titanium, or silver.

Alternatively, the negative electrode plate may be formed of, for example, an aluminum cadmium alloy. Similar to the positive electrode plate, the negative electrode plate may have a fine ribbed structure on the surface thereof so as to increase the bonding force of the active material. The negative electrode plate may be implemented in any of various forms such as, for example, a film, sheet, foil, porous material, foam, or non-woven fabric.

The separator is interposed between the negative electrode and the positive electrode and serves to electrically insulate the electrodes from each other. Typically, the separator may be any of, for example, a known polyolefin-based separator and a composite separator having an organic/inorganic composite layer formed on an olefin-based substrate, without being specially limited thereto.

In addition, a separator for electrical insulation is interposed between the neighboring unit cells. At this time, the unit cell may have a bi-cell configuration in which outermost electrodes have the same polarity, or a full-cell configuration in which outermost electrodes have opposite polarities.

In addition, the electrode assembly 20 may have any of various configurations based on a method of stacking unit cells. That is, the electrode assembly 20 may be formed into, for example, a simplified stack configuration, a stack/folding type configuration, or a jelly-roll configuration.

The simplified stack configuration is a configuration in which a plurality of unit cells is stacked one above another in sequence. The stack/folding type configuration is a configuration in which a plurality of unit cells is arranged at a given distance on a strip-shaped separator, and the separator is rolled in a given direction so that the unit cells are inserted between respective folds of the separator. The jelly-roll configuration is a configuration in which unit cells are formed into a strip shape and are rolled in a given direction.

The electrode assembly 20 is provided with electrode tabs 21 and 22, which extend from the respective electrode plates and have different polarities. The electrode tabs 21 and 22 are welded to electrode leads 23 and 24, which are formed of the same material as and have the same polarity as the respective electrode tabs. That is, among the electrode tabs 21 and 22, the positive electrode tap 21 corresponding to the positive electrode is coupled to the positive electrode lead 23, and the negative electrode tap 22 corresponding to the negative electrode is coupled to the negative electrode lead 24.

The electrode leads 23 and 24, as described above, may be electrically connected to the electrodes of the electrode assembly 20 and may be exposed outside the pouch 30 at one end thereof.

The plate surface of the electrode assembly 20 in accordance with the present embodiment has a rectangular shape. Although the electrode assembly 20 will be described below as having the configuration described above, the embodiment of the present invention is not limited thereto.

The pouch 30, which is configured to receive the electrode assembly 20, has a receiving space in which the electrode assembly 20 is received, and includes upper and lower sheets 31 and 32, which respectively surround the upper and lower plate surfaces of the electrode assembly 20.

The upper and lower sheets 31 and 32 may respectively have spaces capable of receiving the electrode assembly 20 (see FIG. 1), and the space inside the upper and lower sheets 31 and 32 in which the electrode assembly 20 is received may be recessed via, for example, pressing.

Each of the upper and lower sheets 31 and 32 may take the form of a stack including an insulator film for electrical insulation, a thermal adhesion film, which is disposed on the insulator film and may be melted to enable sealing when it is heated and compressed, and a metal film interposed between the insulator film and the thermal adhesion film in order to prevent the entry of moisture.

The insulator film serves to protect the battery from the outside. To this end, the insulator film may be formed of, for example, nylon or polyethyleneterephthalate, which has a high mechanical strength. The metal film may typically be formed of aluminum. The thermal adhesion film serves as an adhesive because of the thermal adhesion property thereof. The thermal adhesion film may be formed of, for example, a polyolefin-based resin layer or cast polypropylene (C-PP).

When the electrode assembly 20 is seated in the receiving space in the lower sheet 32, a terrace 40; 41, 42, 43 and 44, which is an empty space in the receiving space excluding the space occupied by the electrode assembly 20, is generated. The electrode assembly 20 is sealed as the upper sheet 31 is bonded to the lower sheet 32 such that the receiving space of the upper sheet 31 is located above the electrode assembly 20. The receiving space in the pouch 30 is sealed as the upper and lower sheets 31 and 32 are bonded to each other via heating compression. The receiving space may be sealed via bonding of outer peripheral sealing regions 33, which are formed along the outer peripheral regions of the upper and lower sheets 31 and 32.

When the receiving space in the pouch 30 is sealed, the upper and lower sheets 31 and 32 are bonded to each other by compressing portions of the upper and lower sheets 31 and 32, which correspond to the terrace 40, in the thickness direction (the Z-axis). Here, the contact region of the upper and lower sheets 31 and 32 is a terrace sealing 50. In addition, the terrace sealing 50 may be a region surrounded by the outer peripheral sealing region 33, the electrode assembly 20, and the electrode lead 23 or 24.

When the plate surface of the electrode assembly 20 has a polygonal shape, the terrace sealing 50 may be formed in at least one of the respective corners of the polygonal electrode assembly. As exemplarily illustrated in FIG. 4, when the plate surface of the electrode assembly 20 has a rectangular shape, terraces 41, 42, 43 and 44 may be formed at the four respective corners. Although FIG. 4 illustrates the terrace sealing 50 formed at all of the four corners, the terrace sealing 50 may be formed at only one of the four corners. At this time, the terrace sealing 50 may have an approximately rectangular shape, but it is to be noted that the shape of the terrace sealing may vary according to the configuration of the pouch 30 and the electrode assembly 20.

Through the process of forming the terrace sealing 50, gas generated during manufacture may be discharged outward, and the electrode assembly 20 mounted inside the terrace 40 may be more firmly fixed and supported.

FIGS. 6A to 6D are plan views illustrating alternative embodiments of a terrace sealing in the pouch type secondary battery in accordance with one embodiment of the present invention.

The terrace sealing 50 is shaped such that the cross section of a plane (x-y plane) crossing the thickness direction of the sheet has any one of circular, polygonal, and amorphous shapes, and may be selected from among the various shapes illustrated in FIGS. 6A to 6D.

The cross section of the terrace sealing 50 may have a circular shape as illustrated in FIG. 6A, and two terrace sealings 50 may be formed in one terrace as illustrated in FIG. 6B.

In addition, the cross section of the terrace sealing 50 in the plane (x-y plane) crossing the thickness direction of the sheet may be shaped so as to come into contact with all of the outer peripheral sealing region 33, the electrode assembly 20, and the electrode lead 23 or 24. In one example, when the terrace sealing 50 has a star shape as illustrated in FIG. 6D, the terrace sealing is shaped such that the respective vertices thereof come into contact with all of the outer peripheral sealing region 33, the electrode assembly 20, and the electrode lead 23 or 24.

In addition, the cross section of the terrace sealing 50 may have a line 50a, which is formed along the electrode assembly so that no empty space is present in a region where the terrace sealing comes into contact with the electrode assembly 20 (see FIG. 4).

A sheet penetration hole 38 is a hole that is formed in at least one of the upper and lower sheets 31 and 32 so as to penetrate the corresponding sheet in the thickness direction, and is positioned so as to overlap the terrace sealing 50. That is, the periphery of the sheet penetration hole 38 is surrounded by the terrace sealing 50, and consequently, no battery constituent material is introduced into or discharged from the pouch 30, whereby the seal of the pouch 30 may be maintained.

As illustrated in FIG. 6A, one sheet penetration hole 38 may be provided at one terrace sealing 50. When two terrace sealings 50 are formed in one terrace as illustrated in FIG. 6B, the sheet penetration hole may be provided at each terrace sealing 50. In addition, a plurality of sheet penetration holes 38 may be provided at one terrace sealing 50 as illustrated in FIG. 6C. In addition, the cross section of the sheet penetration hole 38 may have not only the circular shape, but also a shape corresponding to the shape of the cross section of the terrace sealing 50 as illustrated in FIG. 6D, or may have any of various other shapes.

FIG. 7 is a conceptual view illustrating a plurality of pouch type secondary batteries, which is successively aligned, in accordance with one embodiment of the present invention.

As illustrated in FIG. 7, when it is attempted to stack the pouch type secondary batteries in accordance with one embodiment of the present invention parallel to each other, the pouch type secondary batteries may be aligned such that the sheet penetration holes 38 are aligned with each other in the stacking direction, and thereafter may be stably fixed and stored by support bars 60.

When movement or external force is transferred to the pouch type secondary battery 10 in accordance with one embodiment of the present invention, the electrode assembly 20 provided in the receiving space 33 in the pouch 30 is fixed and supported via the terrace sealing 50 formed in the terrace 40, which may prevent damage to the electrode assembly 20 and prevent internal short circuits, and ultimately, may ensure excellent safety.

As described above, the pouch type secondary battery in accordance with one embodiment of the present invention may acquire the advantage of discharging transferred heat outward while fixing the electrode assembly via the terrace sealing, which is mounted in the terrace formed in the pouch in which the electrode assembly is received.

Hereinafter, a method of manufacturing a pouch type secondary battery in accordance with one embodiment of the present invention will be described with reference to the accompanying drawing.

FIG. 8 is a flowchart illustrating a method of manufacturing a pouch type secondary battery in accordance with one embodiment of the present invention.

The method of manufacturing a pouch type secondary battery in accordance with one embodiment of the present invention includes providing an electrode assembly and a pouch (S100), receiving the electrode assembly in the pouch (S200), forming a terrace sealing (S400), and forming a sheet penetration hole (S400).

First, the electrode assembly 20, which includes a positive electrode plate coated with a positive electrode active material, a negative electrode plate coated with a negative electrode active material, and a separator configured to electrically separate the positive electrode plate and the negative electrode plate from each other, is mounted in a unit cell.

Then, after mounting the electrode tabs 21, which extend from the respective electrode plates constituting the electrode assembly 20 and have different polarities, the electrode leads 23 and 24, each of which is formed of the same material and the same polarity as a corresponding electrode tab, are welded to the respective electrode tabs 21 and 22.

Subsequently, after the electrode assembly 20 is received in the receiving space 33 in the upper and lower sheets 31 and 32, the upper and lower sheets 31 and 32 are sealed to each other using heating compression so as to complete primary sealing of the pouch 30 in which the electrode assembly 20 is inserted and mounted.

At this time, the pouch 30 is larger than the electrode assembly 20 and is filled with gas generated through repeated charge and discharge cycles for activation.

Then, after one side of the pouch 30 is cut, the gas inside the pouch 30 attributable to repeated charge and discharge cycles for activation, is removed, and the cut open side of the pouch 30 is finished via repeated sealing.

Subsequently, in order to remove gas that may be additionally generated during the repeated sealing of the pouch 30, the sheet penetration hole 38 is formed in the pouch 30. The process of forming the sheet penetration hole 38 may be performed after the terrace sealing 50, which will be described below, is formed.

That is, the sheet penetration hole 38 is formed in at least one of the upper and lower sheets 31 and 32, which close the terrace 40 in the pouch 30, which is not occupied by the electrode assembly 20, whereby the gas received inside the pouch 30 is removed.

Thereafter, the upper and lower sheets 31 and 32 surrounding the terrace 40 are compressed and bonded to each other in the thickness direction, whereby the terrace sealing 50 is formed.

Technical feature of the terrace sealing 50, such as, for example, the shape thereof, are the same as the above description, and thus a detailed description thereof is omitted herein.

Although the pouch type secondary battery of the present invention has been described above based on a specific shape and direction with reference to the accompanying drawings, the present invention may be altered and modified in various ways by those skilled in the art, and these alterations and modifications should be construed as being included in the scope of the present invention.

[Description of Reference Numerals]

| | |
|---|---|
| 10: pouch type secondary battery | 20: electrode assembly |
| 21: positive electrode tap | 22: negative electrode tap |
| 23: positive electrode lead | 24: negative electrode lead |
| 30: pouch | 31: upper sheet |
| 32: lower sheet | 33: sealing region |
| 40: terrace | 50: terrace sealing |

The invention claimed is:

1. A pouch type secondary battery comprising:
   an electrode assembly including a cell and an electrode;
   a pouch having a receiving space configured to receive the electrode assembly therein, the pouch including upper and lower sheets configured to surround upper and lower plate surfaces of the electrode assembly respectively;
   an outer peripheral sealing region formed by compressing the upper and lower sheets, the outer peripheral sealing region surrounding the electrode assembly and the receiving space;
   a terrace sealing formed by compressing the upper and lower sheets, which surround a terrace, in a thickness direction thereof so that the upper and lower sheets come into contact with each other, the terrace being an empty space in the receiving space excluding a space occupied by the electrode assembly, the terrace sealing being disposed within the receiving space and surrounded by the outer peripheral sealing region; and
   at least one sheet penetration hole formed in at least one sheet of the upper and lower sheets so as to penetrate the at least one sheet in the thickness direction, the sheet penetration hole being formed at a position overlapping the terrace sealing, the sheet penetration hole being configured to remove gas from the receiving space, the sheet penetration hole remaining within the receiving space and within the outer peripheral sealing region after assembly of the pouch type secondary battery is completed,
   wherein the upper and lower plate surfaces of the electrode assembly have an outer perimeter facing away from a geometric center of the upper and lower plate surfaces, and the terrace sealing is located outside of the outer perimeter of the upper and lower plate surfaces.

2. The battery according to claim 1, wherein the terrace sealing is formed such that a cross section thereof in a plane crossing the thickness direction of the upper and lower sheets has any one of circular, polygonal, and amorphous shapes.

3. The battery according to claim 2, wherein the cross section of the terrace sealing has a line formed along the electrode assembly so as to prevent an empty space from being defined in a region where the terrace sealing comes into contact with the electrode assembly.

4. The battery according to claim 1, wherein, when the plate surface of the electrode assembly has a polygonal shape, the terrace sealing is formed in at least one of respective corners of the electrode assembly having a polygonal shape.

5. The battery according to claim 1, further comprising an electrode lead electrically connected to the electrode of the electrode assembly, one end of the electrode lead being exposed outside the pouch,
   wherein the terrace sealing is surrounded by the outer peripheral sealing region, the electrode assembly, and the electrode lead.

6. The battery according to claim 5, wherein the terrace sealing is shaped such that a cross section thereof in a direction crossing the thickness direction of the sheets comes into contact with all of the outer peripheral sealing region, the electrode assembly, and the electrode lead.

7. A method of manufacturing a pouch type secondary battery comprising:
   providing an electrode assembly including a cell and an electrode and a pouch having a receiving space configured to receive the electrode assembly therein, the pouch including upper and lower sheets configured to surround upper and lower plate surfaces of the electrode assembly respectively;
   receiving the electrode assembly in the receiving space in the pouch;
   forming an outer peripheral sealing region to seal the electrode assembly by bonding outer peripheral regions of the upper and lower sheets to each other, the outer peripheral sealing region surrounding the electrode assembly and the receiving space;
   after forming the outer peripheral sealing region, forming a terrace sealing within the receiving space and surrounded by the outer peripheral sealing region by compressing the upper and lower sheets, which surround a terrace, in a thickness direction so as to bond the upper and lower sheets to each other, the terrace being an empty space in the receiving space excluding a space occupied by the electrode assembly;
   charging and discharging the electrode assembly;

after the charging and discharging, and before or after the forming the terrace sealing, removing gas generated during the charging and discharging by forming a sheet penetration hole in at least one sheet of the upper and lower sheets so as to penetrate the at least one sheet of the upper and lower sheets in the thickness direction, the sheet penetration hole being formed at a position overlapping the terrace sealing, the sheet penetration hole remaining within the receiving space and within the outer peripheral sealing region after the method of manufacturing the pouch type secondary battery is completed, wherein the upper and lower plate surfaces of the electrode assembly have an outer perimeter facing away from a geometric center of the upper and lower plate surfaces, and the terrace sealing is located outside of the outer perimeter of the upper and lower plate surfaces.

8. The method according to claim 7, wherein the forming of the terrace sealing is performed such that a cross section thereof in a plane crossing the thickness direction of the upper and lower sheets has any one of circular, polygonal, and amorphous shapes.

9. The method according to claim 8, wherein the cross section of the terrace sealing has a line formed along the electrode assembly so as to prevent an empty space from being defined in a region where the terrace sealing comes into contact with the electrode assembly.

10. The method according to claim 7, wherein, when the plate surface of the electrode assembly has a rectangular shape, the forming includes forming the terrace sealing in at least one of respective corners of the electrode assembly having a rectangular shape.

* * * * *